United States Patent [19]
Lorang

[11] 3,987,716
[45] Oct. 26, 1976

[54] APPARATUS FOR REDUCING ESCAPE OF WATER VAPOR FROM COFFEE MAKERS

[76] Inventor: Walter R. Lorang, 2239 W. Maple Road, Walled Lake, Mich. 48088

[22] Filed: Dec. 8, 1975

[21] Appl. No.: 638,539

[52] U.S. Cl. .................................. 99/279; 99/282
[51] Int. Cl.² .......................................... A47J 31/00
[58] Field of Search ............ 99/279, 280, 281, 282, 99/283

[56] References Cited
UNITED STATES PATENTS

| | | | |
|---|---|---|---|
| 3,513,767 | 5/1970 | Bloomfield et al. .................. | 99/282 |
| 3,589,271 | 6/1971 | Tarrant et al. ......................... | 99/280 |
| 3,641,918 | 2/1972 | Schellgell et al. ..................... | 99/279 |
| 3,793,934 | 2/1974 | Martin ................................... | 99/282 |

*Primary Examiner*—Leonard D. Christian
*Assistant Examiner*—Arthur O. Henderson
*Attorney, Agent, or Firm*—William T. Sevald

[57] ABSTRACT

Apparatus for reducing the escape of water vapor from a heated water reservoir tank of a coffee machine to prevent drop in the water level by evaporation particularly during long periods of non-use. The machine has an outlet fitting leading to use from a point adjacent the top of the tank and a water inlet stand-pipe leading to the bottom of the tank to introduce displacement water into the tank. A looped tube leads from the top of the tank to the stand-pipe and in spaced relation thereto. Water vapor moves into the looped tube and is reintroduced to the tank by the stand-pipe to reduce depletion. The looped tube also constitutes a vacuum break for the sealed tank to allow entry and exit of displacement water. A baffle wall extends downwardly from the top of the tank into the water and surrounds the outlet fitting so that water vapor cannot escape via the outlet fitting.

2 Claims, 5 Drawing Figures

APPARATUS FOR REDUCING ESCAPE OF WATER VAPOR FROM COFFEE MAKERS

BACKGROUND OF THE INVENTION

Coffee machines are in general use in offices, plants, and homes. The machines in issue are the type which are ready to make coffee immediately by maintaining a reservoir of heated water by thermostatic control with the hot water displaced to the brew pot upon the user pouring cold water into the machine.

During periods of inactivity the average user leaves the machine connected so that a supply of heated water is maintained. Without a water vapor saver, the water evaporates to atmosphere and the operational water level in the tank drops substantially. When a user then activates the machine by pouring a measured volume of cold water into it to make a desired quantity of coffee, the measured volume is depleted by the volume previously evaporated so that the desired quantity is not obtained. This is occasioned by the fact that the water reservoir must first be brought up to operational level from which it has dropped due to evaporation.

This causes dissatisfaction with the machine. The fact that it is the user's carelessness which causes the depletion of water does not excuse what the user regards as a mal-function. The machine thus loses desirability through no fault of its own.

SUMMARY OF THE PRESENT INVENTION

The invention employs a water reservoir tank which is sealed except for a water inlet stand-pipe, a water outlet fitting to the brew pot, and a looped vapor tube leading to the stand-pipe. The water inlet stand-pipe leads to the bottom of the tank so that it is sealed off relative to water vapor by the water in the tank. A baffle wall surrounds the water outlet fitting and extends down from the top of the tank into the water well past the normal operational water level of the tank. The baffle wall thus blocks escape of water vapor via the outlet fitting except for the minimal surface of the water enclosed by the baffle. This leaves substantially the entire surface of the water in the tank in communication with the top of the tank outside the baffle wall. The looped vapor tube leads from the top of the tank so that it is the only free escape for water vapor from the tank. The looped vapor tube leads over to the stand-pipe and lies in spaced relation with and/or just above the stand-pipe. The water vapor loses heat in the looped tube, the stand-pipe and in the pan area and condenses to liquid. The stand-pipe then returns the liquid to the tank thus maintaining the tank at desired operational water level.

Thus during periods of non-use, especially when the water heater is energized, water vapor rising from the water in the tank is confined in the tank and vented by the looped tube and channeled over to the stand-pipe where it is condensed, collected and reintroduced to the tank. It has been found that the present invention maintains the desired operational water level of a coffee maker satisfactorily close to optimum so that when a measured volume of water is poured into the machine, even after several days of non-use, that the desired quantity of coffee is obtained due to the fact that the operational water level has been maintained without undesirable depletion. The structure and operation will be apparent from the accompanying drawings and the following detailed description of the invention.

DETAILED DESCRIPTION OF THE ILLUSTRATED EMBODIMENTS

Figure 1:
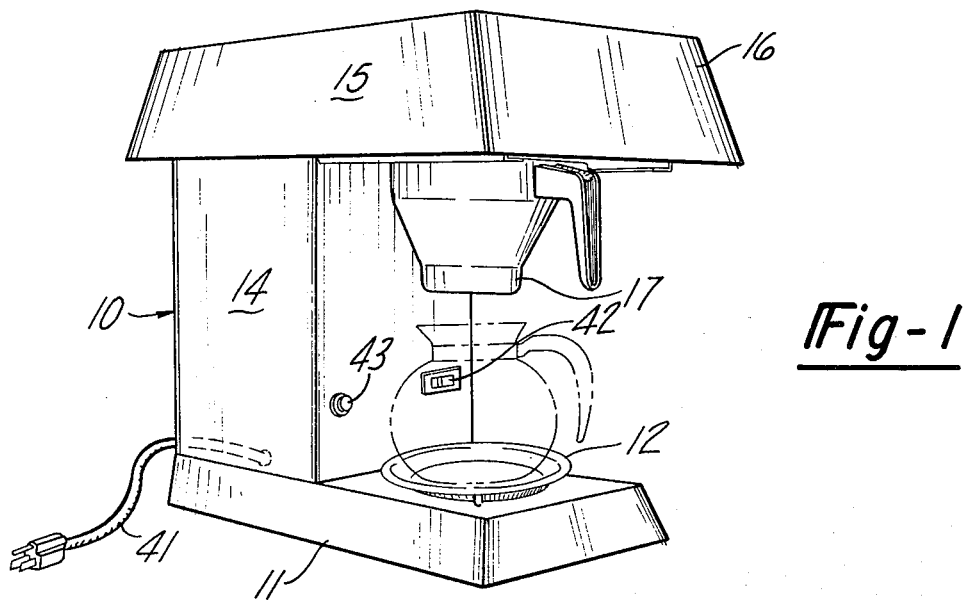
FIG. 1 is a left front oblique elevational view of a coffee machine showing a roof-like top which houses the water receiving pan and the elements of the invention.

Referring now to the drawings wherein like reference numerals refer to like and corresponding parts throughout the several views, the novel water vapor conservation apparatus disclosed therein to illustrated preferred embodiments of the invention comprises a coffee making machine 10 which has a base 11. A warming stove 12, FIG. 1, and a column 14 are supported on the base 11. A "mansard-roof" housing top 15 is mounted on the column 14 and has a projection 16 cantilevered out over the stove 12. A brew pot 17 is removably mounted on the projection 16 of the top 15 so as to overlie the stove 12. A glass bowl receptacle, not shown, rests on the stove 12 under the brew pot 17.

Figure 2:
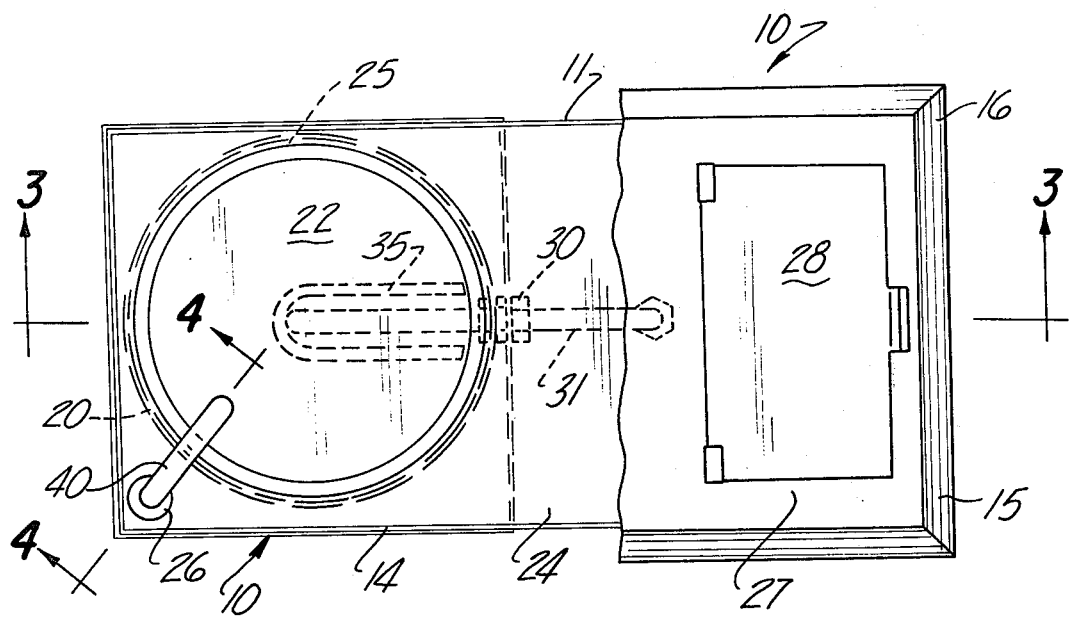
FIG. 2 is an enlarged top plan view of the machine seen in FIG. 1 with the top broken away to show a portion of the new pan, the looped tube, the top end of the stand-pipe, and the top of the tank; internal parts of the tank are shown in broken lines including the baffle wall and outlet tube and fitting.
Figure 3:
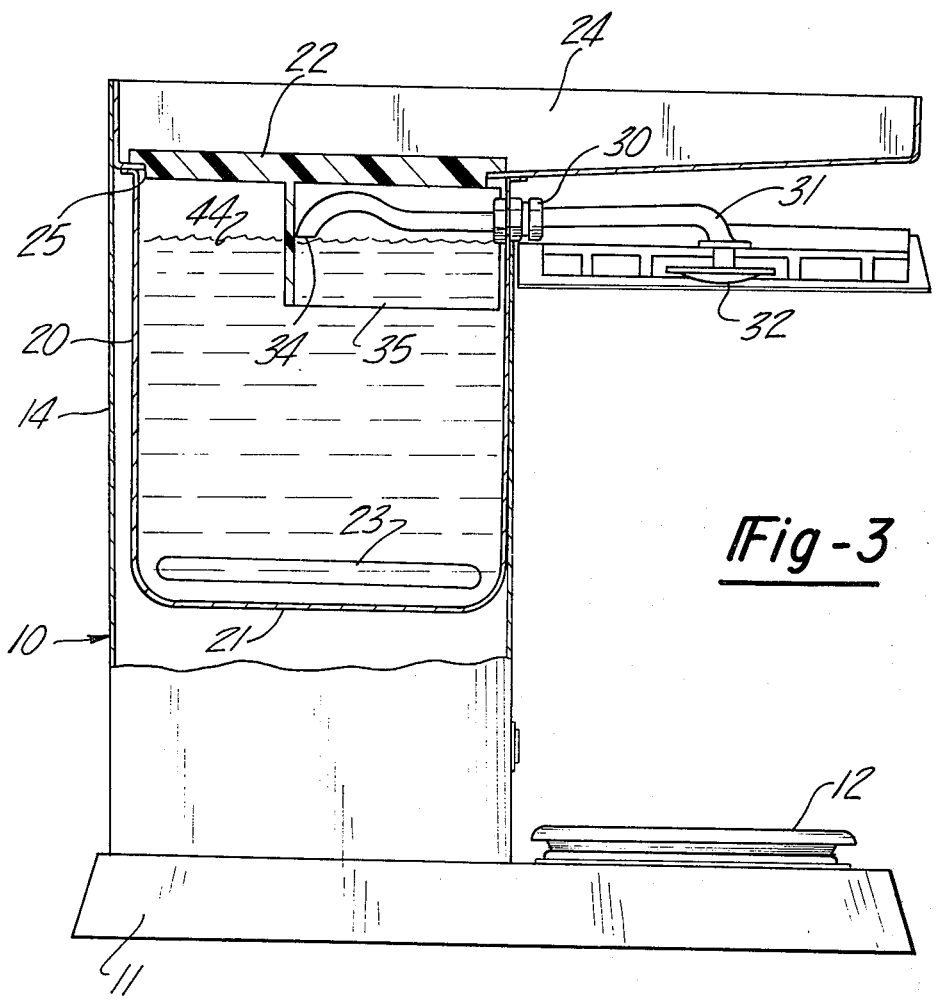
FIG. 3 is a cross-sectional view of the apparatus seen in FIG. 2 taken on the line 3—3 thereof, partly in elevation and with parts broken away, showing the tank, cover, and pan in cross-section and the brew sprayhead, a portion of the cabinet, and a heater in elevation, with the cabinet broken away to reveal the interior.

A tank 20, FIGS. 2 and 3, lies in the column 14 and has an integral bottom 21 and a sealed cover lid 22. A heating element 23 lies in the tank 20 adjacent the bottom 21. A pan 24 lies in the housing top 15 over the tank 20, extends out over the stove 12, and has an aperture 25 for service over the tank 20. The tank cover lid 22 seals the aperture 25. The lid 22 is press-fitted into the aperture 25 to prevent water in the pan 24 from entering the tank 20 at its top. The lid 22 is easily removed for cleaning the tank 20 and servicing internal parts. A stand-pipe 26 has a top end connected in the pan 24 and a bottom end connected to the tank 20 near its bottom 21. The housing top 15 has an opening 27 through which displacement water is poured into the pan 24. A hinged door 28 removably covers the opening 27.

A water outlet fitting 30 is mounted on the tank 20 at a point spaced downwardly of the tank lid 22 to provide an airhead above the fitting 30. A tube 31 leads outwardly from the fitting 30 and terminates in a sprayhead 32 over the brew pot 17. An arched siphon tube 33 leads inwardly from the fitting 30 and terminates in an open end 34. A baffle wall 35, U-shaped in cross-section, depends from the lid 22 and closely surrounds the arched siphon tube 33 to isolate its open end 34 from communication with the air-head above the fitting 30. The baffle wall 35 is sealed off at the top by the lid 22 and at the bottom by extending well below the level of the water in the tank 20.

Figure 5:
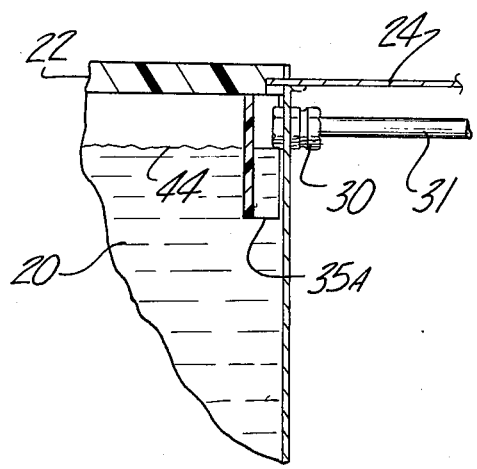

FIG. 5 is an embodiment which does not have the siphon tube so that water is emitted directly through the fitting 30 to the tube 31 and spray-head 32. The baffle wall 35A is much smaller and isolates a much smaller water surface area adjacent the fitting 30.

A looped water vapor tube 40 has a first end sealed in the tank cover lid 22 and a second end overlying the top end of the stand-pipe 26 at its upper end and in spaced relationship thereto. The looped tube also provides a vacuum break for the tank to allow the inflow and outflow of water.

To set up for operation, the user fills the tank 20 by pouring water through the housing opening 27 into the pan 24 until water runs out the spray-head. This establishes the operational water level 44 as shown. A cord 41 is turned to "on." When a lamp 43 is energized, the water in the tank has been heated to coffee making temperature at the operational water level 44. Ground coffee is placed in the brew pot 17 and a glass bowl placed on the stove 12 under the brew pot 17.

Figure 4:
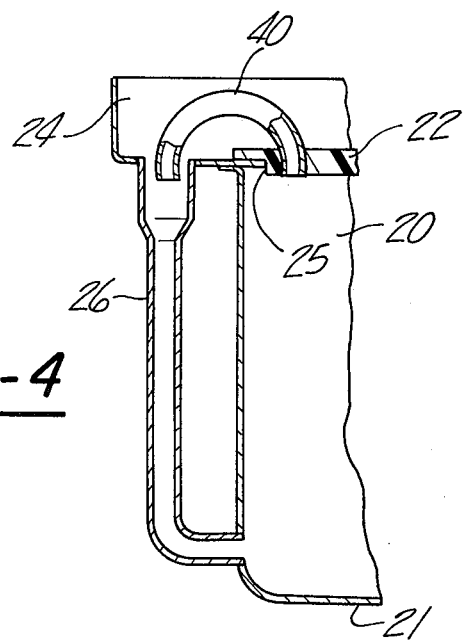
FIG. 4 is a partial cross-sectional view of the apparatus seen in FIG. 2 taken on the line 4—4 thereof showing the tank, stand-pipe and looped vapor tube in cross-section with the tank and pan broken away; and, FIG. 5 is a view similar to FIG. 4 showing an embodiment employing an outlet fitting and a small baffle wall.

To make a desired quantity of liquid coffee, such as a full glass bowl, the user fills a glass bowl with water, preferably cold, and pours the water through the opening 27 into the pan 24 from where it gradually flows down the stand-pipe 26 into the tank 20 and the water level rises in the tank 20 above the normal level 44 and gradually runs out the fitting 30 to the spray-head 32, FIG. 5, or submerges the arch of the siphon tube 31 whereupon water is siphoned out of the tank and flows to the spray-head 32, FIG. 4. The water continues to flow to the spray-head 32 in either embodiment until the level 44 is attained whereby a quantity of water equal to the bowl of water poured in is emitted from the spray-head 32 giving the user the desired quantity of brewed liquid coffee. Thus if the operational water level 44 is maintained, the user will receive back the quantity of brewed coffee substantially equal to the quantity of water he pours in.

Assuming the situation where the office user leaves the machine 10 "on" from 5:00 PM Friday night to 9:00 AM, Monday morning, the water in the machine has been kept heated and unreplenished for a period of 63 hours — but it is ready to make coffee immediately at 8:00 AM on Monday. Without water vapor recovery and reintroduction apparatus, a machine under said circumstances will evaporate normally between a pint and a quart of water. Thus when the user on Monday pours in the measured desired quantity, it takes a pint to a quart to bring the tank up to its operational water level 44 and the quantity emitted is depleted by this volume. And if a quart and a half bowl is used to pour water in, the coffee brewed is about half as much as desired in quantity and about twice as strong as desired in strength.

However, with the water vapor conservation and reintroduction apparatus of the invention and under the same circumstances, the water vapor evaporated by the hot water emits from the looped tube 40 and is directed into the stand-pipe 26. Any water vapor not condensed to liquid by the tube 40 and pipe 26, lies in the pan 24 and is condensed to droplets by the pan 24 over its entire length including its exposed cooler portion cantilevered outwardly of the tank 20 and exposed to atmosphere cooling on its bottom above the spray-head 32. Water droplets in the pan 24 also run to the stand-pipe 26 and are delivered back to the tank 20. Thus while the water in the tank remains hot and ready to brew coffee, the operational water level 44 is maintained to deliver to the spray-head 32 a quantity of water substantially equal to the quantity of water poured into the pan 24.

The appended claims define the scope of the patent protection of the invention.

I claim:

1. Apparatus for reducing the escape of water vapor from a coffee making machine comprising,
    a tank having a closed bottom and a top,
    a cover lid on said top of said tank closing said tank to atmosphere,
    a heating element in said tank adjacent said bottom,
    a water outlet fitting connected in said tank at a point spaced downwardly from said top of said tank for supplying hot water to make coffee;
    said outlet fitting draining water from said tank to a point just below said fitting thereby establishing the operational water level of said tank;
    a pan above said tank for receiving displacement water,
    a stand-pipe having a top connected to said pan and a bottom connected to said tank; said stand-pipe leading into said tank adjacent said bottom of said tank;
    water poured into said pan running down said stand-pipe into said tank raising the water level in said tank above said outlet fitting whereby said outlet fitting emits water from said tank until the water level drops below said fitting;
    a vapor tube loop having one end sealed in said cover in communication with the interior of said tank above said fitting and a second end in spaced communication with said top of said stand-pipe so that water vapor is discharged into said stand-pipe and into said pan adjacent said stand-pipe;
    and a baffle wall around said outlet fitting extending downwardly from said cover to a point well below the operational water level of said tank surrounding and isolating said outlet fitting from the main body of the water surface in said tank outside said baffle wall;
    water vapor rising from water in said tank outside of said baffle wall moving into said looped tube and being cooled to liquid in said looped tube, pan, and stand-pipe, and reintroduced to said tank by said stand-pipe to maintain the water in said tank at a satisfactory operational level.

2. In an apparatus as set forth in claim 1, an upwardly arched tube leading inwardly from said outlet fitting and lying in said tank and within said baffle wall constituting a siphon so that no water emits until the arch of said tube is emersed by the rise of the water level upon introduction of displacement water and no water emits after the water level drops below said arched tube.

* * * * *